Oct. 18, 1932.   E. W. SLADKEY   1,883,247
ELECTRICAL SWITCH AND CONTROL CIRCUIT THEREFOR
Original Filed Sept. 17, 1927   2 Sheets-Sheet 2
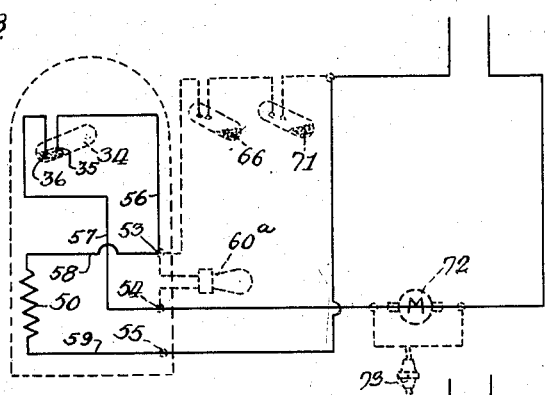
Fig. 8.  Boiler Shut Down.
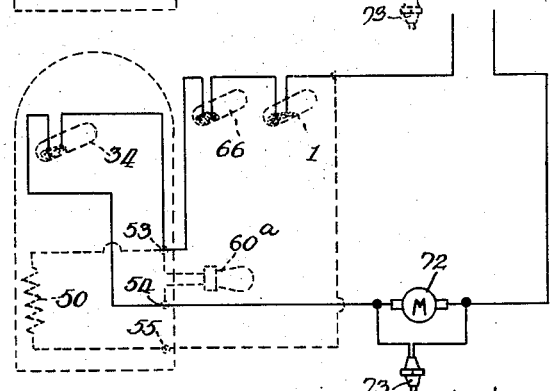
Fig. 9.  Boiler To Be Operated.
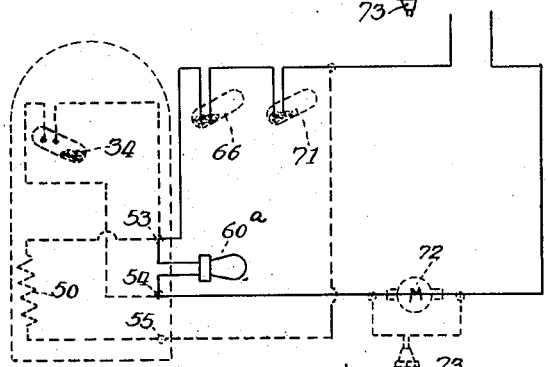
Fig. 10.  Failure of Burner To Ignite
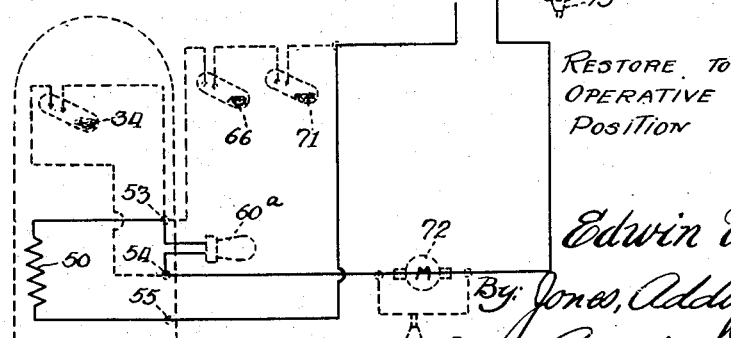
Fig. 11.  Restore To Operative Position
Inventor:
Edwin W. Sladkey
By Jones, Addington,
Ames & Seibold, Attys.

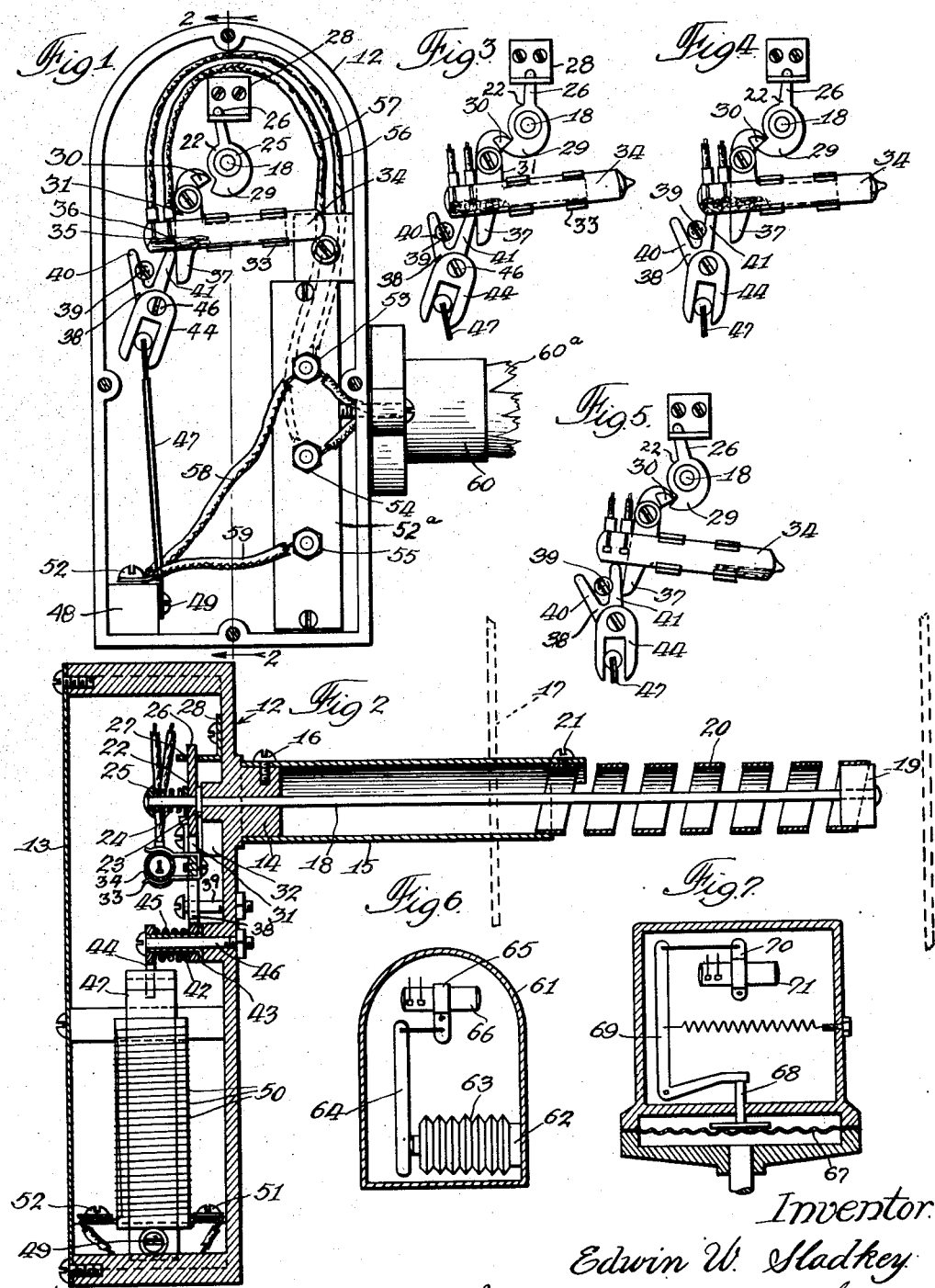

Patented Oct. 18, 1932

1,883,247

UNITED STATES PATENT OFFICE

EDWIN W. SLADKEY, OF JOLIET, ILLINOIS, ASSIGNOR, BY MESNE ASSIGNMENTS, TO MINNEAPOLIS-HONEYWELL REGULATOR COMPANY, OF MINNEAPOLIS, MINNESOTA, A CORPORATION OF DELAWARE

ELECTRICAL SWITCH AND CONTROL CIRCUIT THEREFOR

Application filed September 17, 1927, Serial No. 220,071. Renewed August 15, 1931.

This invention relates to an electrical switch and a control circuit therefor and has special reference to a safety control switch and an electrical control circuit in which said safety switch is embodied.

More particularly, this invention relates to an electrical switch comprising a pair of thermally operated members for actuating a switching means, the latter being preferably of the tiltable type. The thermally operated members of this device are independently operable to actuate the switching means, one of said members being actuated by the heat obtained from a resistance coil in the control circuit and the other of said members being actuated by an external source of heat. The device of this invention is particularly adapted for use in an automatic heating system, wherein numerous electrical devices are connected in an electrical circuit for the normal control of the system, the present device acting as a safety control to open the electrical circuit therethrough and to terminate the operation thereof in the event of the failure of the electrical devices previously mentioned to sustain desirable conditions of combustion.

One of the devices for normally controlling the operation of an automatic heating system may comprise a wall thermostat which controls the generation of heat in a room or other enclosure in order that there be a balance between supply and demand without excessive variations in the room temperature. Other devices may comprise a water thermostat on a hot water heating boiler, a pressure switch on a steam or vapor boiler or an air thermostat upon a warm air furnace. One of the controls just mentioned may be connected in an electrical circuit for the normal control of a heating system, that is, when a room is cooled and is warmed to a predetermined degree, the room thermostat operates to start and to terminate the operation of the burner. However, either one or all of the other controls may be used to control the operation of the burner, the present device actuating only upon the failure of any or all of the previously mentioned devices to operate.

In the safety control devices of the type hereinbefore referred to, it has been usual to operate a member thereof to an abnormal position in order to terminate the operation of the system, as for example, a thermally operated member is heated by means of a resistance element in the control circuit to actuate a tiltable switch into an open circuit position; a fusible element is fused to break the circuit; or a magnet is energized to attract an armature, the latter tilting a switch into an open circuit position. It will be particularly noted that all of these control members are actuated to an abnormal position or condition in order to perform its function. However, the present invention contemplates the return to normal of an element for actuating a switching means to control a circuit.

Other objects and advantages will be apparent from the description and drawings forming a part of this specification to which latter reference may now be had for a more complete understanding of the characteristic features of this invention, in which drawings:

Figure 1 is a front elevational view of the device embodied in this invention showing the cover removed therefrom;

Fig. 2 is a vertical sectional view taken on the line 2—2 of Fig. 1;

Fig. 3 is a view of the operating mechanism of the device of Fig. 1 showing a changed position thereof;

Fig. 4 is a view similar to Fig. 3 showing another changed position of the operating mechanism;

Fig. 5 is a view similar to Fig. 4 showing a still further changed position into which the operating mechanism is actuated;

Fig. 6 is a more or less diagrammatic view of a room thermostatic switch;

Fig. 7 is a view similar to Fig. 6 of a presure operated switch; and

Figs. 8, 9, 10 and 11 are wiring diagrams of the electrical control circuit as embodied in the present invention.

Referring now more particularly to the drawings, the safety control switch shown therein comprises a casing 12 formed preferably of a metal casting having an open face to be enclosed by a cover 13. A projection 14 preferably formed integrally with the rear wall of the casing 12 is adapted to receive and to support a horizontally extending tube 15, the latter being secured by means of a set screw 16 to the projection 14.

The tube 15 extends through an aperture in a stack 17 and is secured thereto by any well known means such, for example, as a flanged collar (not shown) secured to the outer surface of the stack 17 into which the tube 15 is secured by means of set screws or other like securing means. The projection 14 has an aperture extending therethrough communicating with the interior of the casing into which aperture is journalled a rod 18, the latter extending through the tube 15 substantially centrally thereof. The outer end of the rod 18 has a collar 19 fixed thereto for receiving in a fixed relation therewith one end of a helical bimetallic element 20, the other end of the latter member fixedly engaging the outer end of the tube 15 as by means of a screw and nut 21.

An actuating member 22 is loosely mounted on the other end of the rod 18 within the casing 12 and bears against a collar 23 fixedly secured to the rod 18. The actuating member 22 is held in frictional engagement with the shaft by means of a coil spring 24 disposed between a collar member 25 fixed to the rod 18 and the actuating member 22. An arm 26 is formed on the upper end of the actuating member 22 and extends into an opening 27 in a bracket 28, the latter member acting as a stop to limit the rotation of the actuating member.

A tooth 29 is formed on the lower portion of the actuating member 22 for engaging a lug 30 of a tiltable member 31 pivotally mounted on a projection 32 on the rear wall of the casing 12. The tiltable member has a horizontally extending portion upon which a pair of clips 33 are mounted. A mercury contactor tube 34 is mounted in the clips 33 and comprises a hermetically sealed glass container having a pair of spaced cooperating electrodes 35 and 36 disposed therein at the left hand end thereof. A body of current conducting fluid such as mercury is also disposed in the container for making-and-breaking an electrical circuit therethrough as by means of bridging or flowing away from the electrodes upon the tilting of the tube in its two directions.

A lug 37 is formed on the lower portion of the horizontally extending portion of the tiltable member 31 for engagement with a pivotally mounted bifurcated element 38. A stop member 39, which may either be a screw or a pin or the like, is secured to the rear wall of the casing 12 between the arms of the member 38 in order to limit its pivotal movement. As shown in Fig. 1 of the drawings, the arm 40 of the bifurcated element 38 is in an abutting relation with the stop member 39, and the arm 41 thereof is in engagement with the downwardly projecting arm 37 of the pivotal member 31. The bifurcated element 38 is loosely mounted on a short tube 42, the latter having an enlarged end portion 43 against which the member 38 abuts. A second bifurcated element 44 is fixedly mounted on the other end of the tube 42, the tube being upset at the end to provide the securing relation therebetween. Inasmuch as the element 44 is securely fixed to the collar portion 42 and the element 38 is loosely mounted on the tube 42, a spring element 45 is disposed between the element 44 and the element 38, in order that the latter member have frictional engagement with the tube 42. This latter described assembly is pivotally mounted on the rear wall of the casing by means of a screw member 46 passing through the tube and engaging the wall.

A bimetallic strip 47 is preferably secured at the lower end thereof to an insulating mounting block 48 by means of a screw 49 or otherwise. A strip of mica or other insulating material, is disposed on each side of the metallic strip 47 and has a heating coil 50 wound therearound and insulated therefrom. The ends of the heating coil 50 are secured to suitable terminals 51 and 52 on the mounting block 48. Another mounting block 52ª is mounted on the rear wall and on the right hand side thereof, the block having a plurality of terminals 53, 54 and 55 mounted thereon. Electrode 35 is connected to terminal 53 by means of a conduit 56. Electrode 36 is connected to terminal 54 by means of wire 57. Terminal 51 is connected to terminal 53 by means of wire 58 and terminal 52 is connected to terminal 55 by means of wire 59. A socket 60 is secured to the outer side of the casing and preferably contains a 60 watt lamp 60ª. One terminal of the socket is connected to terminal 54, the other terminal thereof being connected to terminal 53.

The structure of the device of the invention having now been recited, reference may be had to Figs. 6 and 7 showing a thermostatically operated switch member and a pressure operated switch member for use in normally operating an electrical control system such as will hereinafter be embodied in a control circuit. The thermostatically operated switch member comprises a mounting base 61 of a suitable insulating material to which is secured a bracket 62 upon which latter is mounted a thermostatically operated element 63 preferably of the expansible and contractible bellows type. The other side of the bellows has a pointed end portion for engaging a vertically extending actuating element 64, this member being pivoted at its lower end and having its upper end connected to a tiltable member 65. A mercury tube contactor switch 66 of the usual type is disposed on the tiltable member 65 in any well known manner and is tiltably operated into an open or closed circuit position by means of the mercury bridging or flowing away from the electrodes therein. In the operation of this device, when a predetermined temperature has been obtained in a room, the bellows 63 expands or contracts to actuate the element 64 to tilt the tube to an open or closed circuit position thereby normally starting or terminating the operation of the system.

The pressure operated boiler switch comprises a casing mounted on a diaphragm chamber. A diaphragm 67 is disposed in the diaphragm chamber and has an upwardly extending member 68 for engagement with a horizontally extending portion of an actuating member 69. The actuating member 69 is pivotally mounted at its lower end, the upper free end thereof being connected to a tiltable member 70 having a contactor tube 71 mounted therein. The contactor 71 is of the usual type having a pair of spaced cooperating electrodes in a body of mercury for bridging or flowing away from the electrodes. In the operation of this device, the changes of pressure on the diaphragm 67 are recorded on the vertically extending member 68 whereby the actuating member 69 is tilted to operate the contactor 71 into an open or closed circuit position.

By referring now to Figs. 8 to 11, inclusive, wiring diagrams are shown illustrating the various conditions of the control circuit in starting and stopping burner operation in the heating system.

In Fig. 8 it has been attempted to show the condition of the electrical circuit when the boiler is shut down, that is, when the burner is not in operation. An electrical circuit exists from one side of the line through the terminal 55, heating element 50, terminal 53, contactor 34, terminal 54, through the motor to the other side of the line. The ohmic resistance of the resistor 50 is such that the value of the current flowing through the motor 72, when the circuit is such as is shown in Fig. 8, is not sufficient to cause the motor to operate. This condition of the circuit is obtained in Fig. 1 likewise, wherein the heat obtained from the heating element 50 has warped the bimetallic element 47. The action of the bimetallic element 47, as has been hereinbefore recited, pivots the bifurcated element 44 whereby the arm 41 of the element 38 engages the arm 37 to tilt the tiltable element 31 into a position such that the mercury bridges the electrodes 35 and 36 to obtain a closed circuit therethrough. It will be noted that the tooth 29 is disengaged from the lug 30 of the tiltable member and that the bimetallic element 47 alone holds the contactor 34.

When the boiler is to be operated, the contactors 66 and 71 are tilted to a closed circuit position, because there is insufficient pressure in the boiler and because a low temperature has been obtained in the room or other enclosure in which the thermostatic switch has been positioned. This is the condition obtaining in the circuit of Fig. 9. The electrical energy now passes from one side of the line through the contactors 66 and 71, the terminal 53, the contactor 34, terminal 54, through the motor and ignition means 73 to the other side of the line to operate the motor and ignition means. It will be noted now that no current passes through the heating element 50 whereby the bimetallic element 47 is permitted to cool. Since the resistor 50 is thus shunted out of circuit, the current flow in the circuit of Fig. 9 is sufficient to operate the motor 72.

If a proper combustion is obtained in the boiler or furnace, the helical bimetallic element 20 is heated and is caused to rotate to turn the rod 18 upon which the actuating element 22 is mounted. Inasmuch as the actuating element 22 is frictionally connected to the rod 18, the former rotates with the latter and the tooth 29 engages the lug 30 of the tiltable element 31. The bimetallic elements 47 and 20 are so timed that upon a proper combustion, the helical element 20 will be caused to rotate before the element 47 has withdrawn its support from the mercury switch. This position is properly illustrated in Fig. 3 of the drawings wherein both the actuating element 22 and the bifurcated element 38 engage their coacting members to hold the contactor 34 in a closed circuit position. However, within a very short period of time the bimetallic element 47 is cooled sufficiently to permit the bifurcated element 38 to withdraw its support from the tiltable member 31, whereby the actuating element member 22 has assumed this burden alone as shown in Fig. 4 of the drawings. In actual practice, it takes from 20 to 30 seconds for the bimetallic element 47 to cool sufficiently to withdraw its support entirely, whereas it takes but approximately 10 seconds for the helical bimetallic element 20 to operate the actuating member 22 to a position to hold the tiltable member in a closed circuit position. This timing is, however, merely illustrative of an operative structure and is not to limit the invention in any manner.

It will be noted that the ignition means 73 is connected across the motor 72. This is also for purposes of showing an operative structure as it may be desirable to actuate the ignition means during the initial operation of the motor only instead of continuing the operation thereof during the entire operation of the motor.

Should the burner fail to ignite for any reason whatsoever, the condition of the electrical circuit will obtain as shown in Fig. 10 of the drawings wherein electrical energy will be conducted from one side of the line through the switches 66 and 71 to the terminal 53 and thence through the lamp $60^a$, terminal 54, through the motor 72 to the other side of the line. By referring back to the mechanical structure, the cooling off of the bimetallic element 47 permits the bifurcated element 38 to withdraw its support from the arm 37, as previously recited, there being no current passing through the heating coil 50. Inasmuch as there is no heat from combustion, the helical bimetallic element 20 remains in a position such as is shown in Fig. 1, wherein the tooth 29 of the actuating member 22 is disengaged from the lug 30 of the tiltable element 31. Therefore, if the rod 18 is not rotated, and the bimetallic element is cooled, there will be no support for the contactor tube, whereafter the latter will be tilted to a position such as will cause the mercury to flow away from the electrodes 35 and 36 thereby breaking the circuit therethrough. The position of the operating mechanism upon the failure of the burner to ignite is shown in Fig. 5.

After the contactor 34 has been actuated to an open circuit position, it is necessary to open the circuit manually by means of the switches 66 and/or 71 in order to reset the safety control switch for the further operation of the heating system. This, of course, is a safety means inasmuch as it requires the attention of the attendant of the system who will be informed of the failure of the system by means of the bright light in the lamp 60ª. Upon opening the circuit through the switches 66 and 71, electrical energy will be conducted from one side of the line through the terminal 55, the heating element 50, the terminal 53, through the lamp 60ª to the terminal 54 and back to the other side of the line through the motor 72. The heating element 50 having energy supplied thereto will cause the bimetallic element 47 to warp and reset the switch, as hereinbefore recited, to the position shown in Fig. 1. During the time that the heating element 50 is actuating the switch 47, a faint glow will be obtained in the filament of the lamp 60ª whereafter when the contactor 34 is reset to a position whereby the mercury bridges the electrodes therein, the electrical energy will take the path of least resistance through the electrodes of the contactor 34 from the terminal 53 to the terminal 54 instead of passing through the lamp 60ª.

It will be noted that during the normal operation of the control circuit, the contactor 34 is either held in position by means of the heating element 50 warping the bimetallic element 47, or by means of the combustion of the fuel in the burner heating the bimetallic element 20. It will be further noted that in case the safety switch herein embodied should be required to terminate the operation of this system, the bimetallic elements 47 or 20 therein return to a normal state to perform the operation required thereby, which, of course, is a more positive and natural action and which is absolutely sure to take place, there being no electrical energy required to actuate the contactor 34 into an open circuit position. The device is so designed that by operating the thermostatically operated switch or the pressure operated switch or both, the heating element 50 is automatically energized or deenergized. Thus, the motor circuit and the heater circuit cannot be closed at the same time, but must alternate in this respect.

As a result of this invention, the elements of this construction are energized to operate the system whereby if the electrical connections should become disconnected or cut, the burner will not be permitted to start. Further, if the helical bimetallic element should burn off or break or if the friction clutch should lose its engagement, the burner will not be operated. Again, the maximum efficiency of safety control is obtained because the operation of the system depends upon the cooling off of the bimetallic element or the return to its natural state instead of depending upon electrical energy to warp the element to an unnatural state. It will also be particularly noted that the more certain power of gravity operates to cause the tiltable switch to actuate into its open circuit position as the said tiltable switch, in the normal operation of the circuit, is held against gravity in an abnormal position.

While but a single embodiment of this invention is herein shown and described, it is to be understood that various modifications will be apparent to those skilled in the art without departing from the spirit and scope of this invention, and therefore, the same is to be limited only by the scope of the appended claims and the prior art.

I claim:

1. An electrical control circuit including switching means for the normal control of an automatic heating system, a safety switch normally held in a closed circuit position, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and electrical indicating means connected in shunt across said safety switch.

2. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and electrical indicating means connected in shunt across said safety switch.

3. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and electrical indicating means connected in shunt across said safety switch whereby the latter may be restored to a normally closed position in response to the operation of said switching means after a failure of said system and a consequent opening of said safety switch.

4. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position and a resistance element connected in shunt across said safety switch.

5. An electrical control circuit including single-circuit switching means for the normal control of an automatic heating system, a safety switch normally held in a closed circuit position and in series with said single-circuit switching means, a bimetallic element for controlling said safety switch, means energized by electrical energy in said control circuit through the open-circuiting of said single-circuit switching means for actuating said bimetallic element to obtain a normally closed position through said safety switch, means responsive to heat conditions in said system for maintaining said safety switch in a normally closed position, and a resistance element connected in shunt across said safety switch.

6. In a control system for a fuel burning device comprising electrically controlled means for supplying a fuel mixture, the combination with a single-circuit control thermostat, a thermostatically controlled actuator, an electrical heating element for said actuator the circuit of which is controlled by said single-circuit control thermostat, of an electric switch adapted to be held in closed position by said actuator when the latter is heated, said electric switch controlling the operation of said fuel supply means when said single-circuit control thermostat is closed, a safety control mechanism influenced by the combustion conditions obtaining in the fuel burning device for controlling said electric switch and for causing said electric switch to remain in closed position as long as combustion continues but permitting said electric switch on the cooling of said actuator to move to open circuit position upon initial failure of combustion or of failure of combustion after being initiated, and means connected in shunt relation to said electric switch for precluding the operation of said fuel supply means when abnormal conditions obtain in the control system but preventing complete deenergization thereof.

7. In a control system for a fuel burning device comprising electrically controlled means for supplying a fuel mixture, the combination with a single-circuit control thermostat, a thermostatically controlled actuator, an electrical heating element for said actuator the circuit of which is controlled by said single-circuit control thermostat, of an electric switch adapted to be held in closed position by said actuator when the latter is heated, said electric switch controlling the operation of said fuel supply means when said single-circuit control thermostat is closed, a safety control mechanism influenced by the combustion conditions obtaining in the fuel burning device for controlling said electric switch and for causing said electric switch to remain in closed position as long as combustion continues but permitting said electric switch on the cooling of said actuator to move to open circuit position upon initial failure of combustion or of failure of combustion after being initiated, and means for preventing complete deenergization of the control system when said electric switch occupies open circuit position.

8. In a control system for a fuel burning device comprising electrically controlled means for supplying a fuel mixture, the combination with a single-circuit control thermostat, a thermostatically controlled actuator, an electrical heating element for said actuator the circuit of which is controlled by said single-circuit control thermostat, of an electric switch adapted to be held in closed position by said actuator when the latter is heated, said electric switch controlling the operation of said fuel supply means when said single-circuit control thermostat is closed, a safety control mechanism influenced by the combustion conditions obtaining in the fuel burning device for controlling said electric switch and for causing said electric switch to remain in closed position as along as combustion continues but permitting said electric switch on the cooling of said actuator to move to open circuit position upon initial failure of combustion or of failure of combustion after being initiated, and means for preventing complete deenergization of the control system when both said single-circuit control thermostat and said electric switch occupy open circuit positions.

9. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and additional means for preventing complete deenergization of said control circuit when both said switching means and said safety switch are in open circuit positions.

10. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and additional means for preventing complete deenergization of the control circuit when said safety switch occupies open circuit position.

11. An electrical control circuit including switching means for the normal control of an automatic heating system, a safety switch normally held in a closed circuit position and in series with said switching means, a member for actuating said safety switch into a normally closed position, means responsive to electrical energy in said control circuit and connected in shunt across said switching means for controlling said actuating member, means responsive to heat conditions in said system for maintaining said safety switch in a normally closed position, and a resistance element connected in shunt across said safety switch, the ohmic resistance of said element being sufficiently high to preclude operation of said heating system but preventing complete deenergization of said control circuit.

12. An electrical control circuit comprising single-circuit switching means for the normal control of an automatic heating system, a safety switch normally held in closed circuit position and in circuit with said single-circuit switching means, a member for actuating said safety switch into closed position, means responsive to the current flow in said control circuit and controlled by said single-circuit switching means for controlling the operation of said actuating member, and thermal responsive means for maintaining said safety switch in a normally closed position.

13. An electrical control circuit including single-circuit switching means for the normal control of an automatic heating system, a safety switch normally held in a closed circuit position, a member for actuating said safety switch into a normally closed position, means responsive to the current flow in said control circuit and controlled by said single-circuit switching means for controlling said actuating member, means responsive to heat conditions in said system for maintaining said safety switch in a normally closed position, and additional means for preventing complete deenergization of said control circuit when both said single-circuit switching means and said safety switch are in open circuit positions.

In witness whereof, I have hereunto subscribed my name.

EDWIN W. SLADKEY.